Nov. 1, 1960 T. C. JONES ET AL 2,958,776
MECHANICAL LINKAGES
Filed Sept. 11, 1958
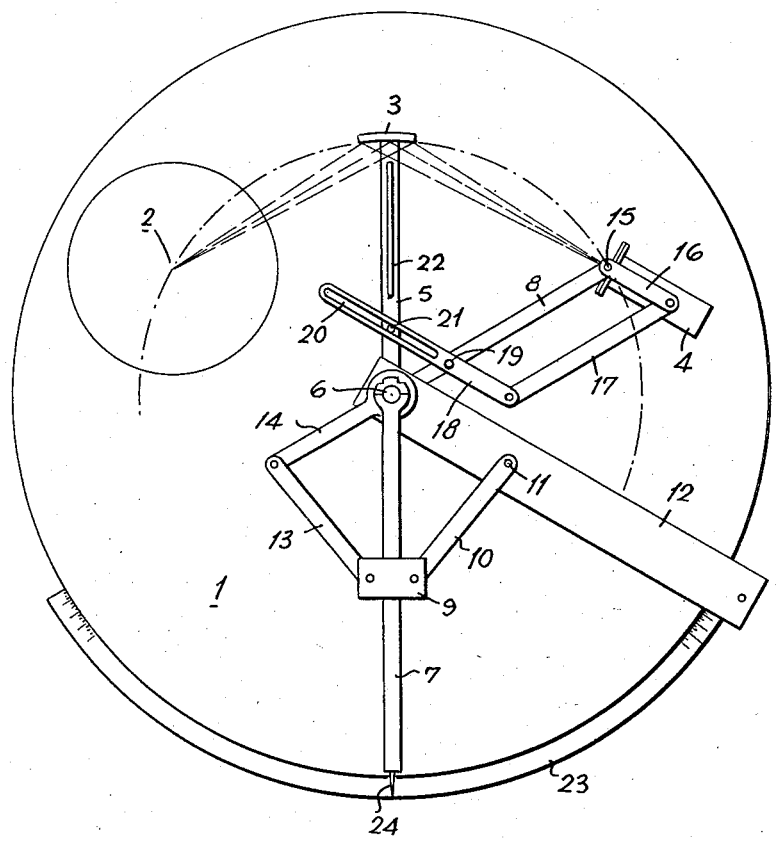
INVENTORS
THOMAS CONWAY JONES
THOMAS MULVEY
BY *Larson and Taylor*
ATTORNEYS United States Patent Office 2,958,776
Patented Nov. 1, 1960

2,958,776

MECHANICAL LINKAGES

Thomas Conway Jones, Calcot, near Reading, and Thomas Mulvey, Caversham, Reading, England, assignors to Metropolitan-Vickers Electrical Company Limited, London, England, a British company Filed Sept. 11, 1958, Ser. No. 760,473

Claims priority, application Great Britain Sept. 11, 1957

4 Claims. (Cl. 250—53)

This invention relates to mechanical linkages and more particularly to ratio linkages between rotatable members.

The invention has an important application in X-ray analysing apparatus of the kind described in co-pending application Serial No. 760,472 filed September 11, 1958. In this apparatus analysis is carried out by bombarding the surface of an element with an electron beam so as to produce X-rays and determining the nature of the element by analysing the X-rays. The analysis of the X-rays is carried out by causing the X-rays to impinge on a crystal so that they are reflected on to an X-ray sensitive device such as a Geiger counter.

It is known that each element produces characteristic X-rays and if these fall on a known crystal the reflections occur at a Bragg angle $\theta$ given by sine $\theta = \lambda/2d$ where $\lambda$ is the wavelength and $d$ is the atomic spacing of the crystal. It follows that if the crystal is carried on one rotating arm and the photo sensitive device on another rotating arm, these two arms can be positioned so that the X-rays will ultimately impinge on the Geiger counter or other device and the positioning of the arms will determine the nature of the element emitting the X-rays.

Clearly the arms can be interconnected through gearing but this would soon give rise to backlash affecting the accuracy of the apparatus.

The main object of the invention is to provide an improved linkage to facilitate setting of the arms.

According to the present invention a coupling between two rotatable arms (or other members) which are both pivotal about the same axis comprises a slider movable along a first arm and coupled through a pair of linkages respectively to a fixed point and to a point at a chosen radius on a second arm, the arrangement being such that rotation of the first arm produces a magnified rotation of the second arm and the ratio of movement of the two arms remains substantially constant.

As applied to the X-ray analyser above referred to, the crystal will be carried on the first arm and the X-ray sensitive device on the second arm and according to a further feature the photo sensitive device is pivotally mounted and coupled through a parallel linkage so that it is always directed towards the crystal to receive reflected rays.

In such a case the linkage must be so adjusted that the angular movement of the second arm i.e. that carrying the X-ray sensitive device, must be double that of the first arm i.e. that carrying the crystal.

In order that the invention may be more clearly understood reference will now be made to the accompanying drawing which shows diagrammatically a plan view of the linkage applied to an X-ray analyser.

In the drawing the reference 1 generally indicates the top of a table carrying the apparatus, 2 is a specimen which is bombarded with an electron beam to produce characteristic X-rays, 3 is a reflecting crystal and 4 is a Geiger counter. The crystal 3 is carried on an arm 5 which is mounted on a pivotal shaft 6 which also carries an arm 7 which is aligned with the arm 5 and fixed to it so that it constitutes an extension of the arm 5. The Geiger counter 4 is carried on a second arm 8 also pivotal about a shaft 6 but independently of the arms 5 and 7. A slider 9 is movable along the arm 7 and is coupled through a first link 10 with a fixed point 11 which is shown as a point on a fixed arm 12. The slider 9 is also coupled through a second link 13 with the end of an arm 14 which is an extension of the arm 8. It will be appreciated that rotation of the arm 7 will rotate the crystal about the chain dotted circle and will also rotate the Geiger counter about the same circle.

In the actual arrangement shown the linkage will be so chosen that angular movement of the arm 8 will be double that of the arm 5. The Geiger counter 4 is pivoted on the arm 8 at the point 15 and is pivotal about this point, its orientation being determined by the parallel linkage 16, 17 and 18 of which the link 18 is pivoted to the arm 8 at 19 and is provided with a slot 20 which moves along a pin 21 on the arm 5. Thus, it will be appreciated that the Geiger counter 4 is always positioned angularly so that it is directed from the crystal 3 to receive the reflected X-rays. In the actual arrangement shown the arm 5 carries a shield 22 to prevent any of the X-rays reaching the Geiger counter directly. The edge of the table 1 is preferably provided with a scale 23 calibrated in Bragg angles so that a pointer 24 may indicate the element directly.

Whilst in the arrangement shown the slider 9 is on the extension arm 7 it will be appreciated that in some arrangements it may, alternatively, be arranged on the actual arm 5 in which case one link may go directly on to the arm 8 and the other link on to a fixed point.

What we claim is:

1. In an X-ray analyser a first arm pivotal about a vertical axis, a reflecting crystal mounted on said first arm, a second arm pivotal about the same vertical axis, an X-ray sensitive device carried on said second arm, a parallel linkage coupling said device with said first arm whereby said device always faces said crystal, a slider mounted on said first arm and movable therealong, a first linkage between said slider and a fixed point and a second linkage between said slider and a point at a chosen radius on said second arm.

2. In an X-ray analyser a source of X-rays, a first arm pivotal about a vertical axis, a reflecting crystal mounted on said first arm, a second arm pivotal about the same vertical axis, an X-ray sensitive device carried on said second arm, a parallel linkage coupling said device with said first arm whereby said device always faces said crystal, a slider mounted on said first arm and movable therealong a first linkage between said slider and a fixed point and a second linkage between said slider and a point at a raduis on said second arm so selected that the ratio of movement of the two arms is such that X-rays from the source are reflected by the crystal on to the X-ray sensitive device.

3. In an X-ray analyser a source of X-rays, a first arm pivotal about a vertical axis, a reflecting crystal mounted on said arm, a second arm pivotal about the same vertical axis, an X-ray sensitive device pivotally mounted on said second arm, a parallel linkage coupling said device with said first arm whereby said device always faces said crystal, a slider mounted on said first arm and movable therealong, a first linkage between said slider and a fixed point and a second linkage between said slider and a point at a radius on said second arm so selected that the ratio of movement of the two arms is such that X-rays from the source are reflected by the crystal on to the X-ray sensitive device.

4. In an X-ray analyser a source of X-rays, a first arm pivotal about a vertical axis, a reflecting crystal mounted on said first arm, a second arm pivotal about the same vertical axis, an X-ray sensitive device carried on said second arm, a parallel linkage coupling said device with said first arm whereby said device always faces said crystal, an extension of said first arm projecting beyond the axis and an extension of said second arm also extending beyond said axis, a slider mounted on the extension of said first arm and movable therealong, a first linkage between said slider and a fixed point and a second linkage between said slider and a point at a radius on the extension of said second arm so selected that the ratio of movement of the two arms is such that X-rays from the source are reflected by the crystal onto the X-ray sensitive device.

References Cited in the file of this patent

UNITED STATES PATENTS

| | | |
|---|---|---|
| 2,540,821 | Harker | Feb. 6, 1951 |
| 2,783,385 | Wytzes | Feb. 26, 1957 |
| 2,805,340 | Lewis | Sept. 3, 1957 |